United States Patent
Choi et al.

(10) Patent No.: US 11,557,241 B2
(45) Date of Patent: Jan. 17, 2023

(54) DISPLAY DEVICE INCLUDING MULTI-CHIP FILM PACKAGE HAVING PLURALITY OF GATE INTEGRATED CIRCUITS MOUNTED THEREON

(71) Applicant: Samsung Electronics Co., Ltd., Suwon-si (KR)

(72) Inventors: Chulho Choi, Seoul (KR); Yongjoo Song, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/717,590

(22) Filed: Apr. 11, 2022

(65) Prior Publication Data
US 2022/0392383 A1 Dec. 8, 2022

(30) Foreign Application Priority Data
Jun. 2, 2021 (KR) .................. 10-2021-0071477

(51) Int. Cl.
*G09G 3/20* (2006.01)
(52) U.S. Cl.
CPC ........ *G09G 3/20* (2013.01); *G09G 2300/0408* (2013.01); *G09G 2310/0267* (2013.01)

(58) Field of Classification Search
CPC ............. G09G 3/20; G09G 2300/0408; G09G 2310/0267
See application file for complete search history.

(56) References Cited

U.S. PATENT DOCUMENTS

| | | | |
|---|---|---|---|
| 6,853,430 B2 | 2/2005 | Murahashi et al. | |
| 7,087,987 B2 | 8/2006 | Chung et al. | |
| 8,648,477 B2 | 2/2014 | Kim | |
| 9,443,463 B2 | 9/2016 | Park et al. | |
| 2018/0049324 A1 | 2/2018 | Koo et al. | |
| 2020/0273431 A1* | 8/2020 | Dong | G09G 5/37 |
| 2020/0273503 A1* | 8/2020 | Wang | G11C 7/20 |

* cited by examiner

*Primary Examiner* — Sejoon Ahn
(74) *Attorney, Agent, or Firm* — Harness, Dickey & Pierce, P.L.C.

(57) ABSTRACT

A display device includes a display panel including data lines configured to receive an image signal, gate lines configured to receive a scan signal, and gate connection lines configured to transmit the scan signal to the gate lines; and a multi-chip film package including, on a film, a first gate integrated circuit (IC) configured to transmit a first scan signal to the gate connection lines through first gate output lines, a second gate IC configured to transmit a second scan signal to the gate connection lines through second gate output lines, and a source IC configured to transmit the image signal to the data lines through source output lines. Each of the first gate output lines is between two adjacent source output lines, and each of the second gate output lines is between two adjacent source output lines.

20 Claims, 10 Drawing Sheets

DISPLAY DEVICE INCLUDING MULTI-CHIP FILM PACKAGE HAVING PLURALITY OF GATE INTEGRATED CIRCUITS MOUNTED THEREON

CROSS-REFERENCE TO RELATED APPLICATION

This application is based on and claims priority under 35 U.S.C. § 119 to Korean Patent Application No. 10-2021-0071477, filed on Jun. 2, 2021, in the Korean Intellectual Property Office, the disclosure of which is incorporated by reference herein in its entirety.

BACKGROUND

The inventive concepts relate to a display device including a multi-chip film package having a plurality of gate integrated circuits mounted thereon, and more particularly, to a display device including a multi-chip film package, on which two gate integrated circuits and one source integrated circuit are mounted.

With the recent development of multimedia and the rapid development of the computer communication industry, semiconductor chips have become compact and have a high capacity and a high speed. Accordingly, semiconductor packages have become thin and highly integrated with multiple pins. Therefore, various types of packages such as semiconductor chip packages, e.g., chip-on-film (COF) packages, which use a film-type assembly board, have been developed. COF semiconductor chip packages are usually used to drive display devices.

A display device may include a display panel displaying an image, a gate integrated circuit driving gate lines of the display panel, a source integrated circuit controlling image data, and a timing controller transmitting image data and control signals. According to the related art, a display device typically includes bezels at both sides of a display panel for attachment of gate integrated circuits. Approaches for realizing a bezel having a thickness that is invisible at a watching distance from the display device, thereby improving and/or maximizing the sense of immersion in a screen have been suggested, including approaches with a display device using a COF semiconductor chip package.

SUMMARY

The inventive concepts provide a display device including a multi-chip film package, in which two gate integrated circuits and one source integrated circuit are mounted on a single film.

According to an aspect of the inventive concepts, there is provided a display device including a display panel including data lines configured to receive an image signal, gate lines configured to receive a scan signal, and gate connection lines configured to transmit the scan signal to the gate lines; and a multi-chip film package including, on a film, a first gate integrated circuit (IC) configured to transmit a first scan signal to the gate connection lines through first gate output lines, a second gate IC configured to transmit a second scan signal to the gate connection lines through second gate output lines, and a source IC configured to transmit the image signal to the data lines through source output lines, wherein each of the first gate output lines is between two adjacent ones of the source output lines, and each of the second gate output lines is between another two adjacent ones of the source output lines.

According to another aspect of the inventive concepts, there is provided a display device including a multi-chip film package including a first gate integrated circuit (IC) on a film, a second gate IC on the film, the second gate IC isolated from direct contact with the first gate IC in a first direction and on a same axis in the first direction as the first gate IC, and a source IC on the film, the source IC isolated from direct contact with the first gate IC and the second gate IC in a second direction perpendicular to the first direction, wherein each of first gate output lines is configured to transmit an output signal of the first gate IC and is between two adjacent ones of source output lines configured to transmit an output signal of the source IC, and each of second gate output lines is configured to transmit an output signal of the second gate IC and is between two adjacent ones of the source output lines.

According to a further aspect of the inventive concepts, there is provided a display device including a multi-chip film package including a first gate integrated circuit (IC) on a film, a second gate IC on the film, the second gate IC isolated from direct contact with the first gate IC in a first direction and on a different axis in the first direction than the first gate IC, and a source IC on the film, the source IC isolated from direct contact with the first gate IC and the second gate IC in a second direction perpendicular to the first direction, wherein each of first gate output lines is configured to transmit an output signal of the first gate IC and is between two adjacent ones of source output lines configured to transmit an output signal of the source IC, and each of second gate output lines is configured to transmit an output signal of the second gate IC and is between two adjacent ones of the source output lines.

BRIEF DESCRIPTION OF THE DRAWINGS

Some example embodiments of the inventive concepts will be more clearly understood from the following detailed description taken in conjunction with the accompanying drawings in which.

DETAILED DESCRIPTION OF THE EMBODIMENTS

Figure 1:
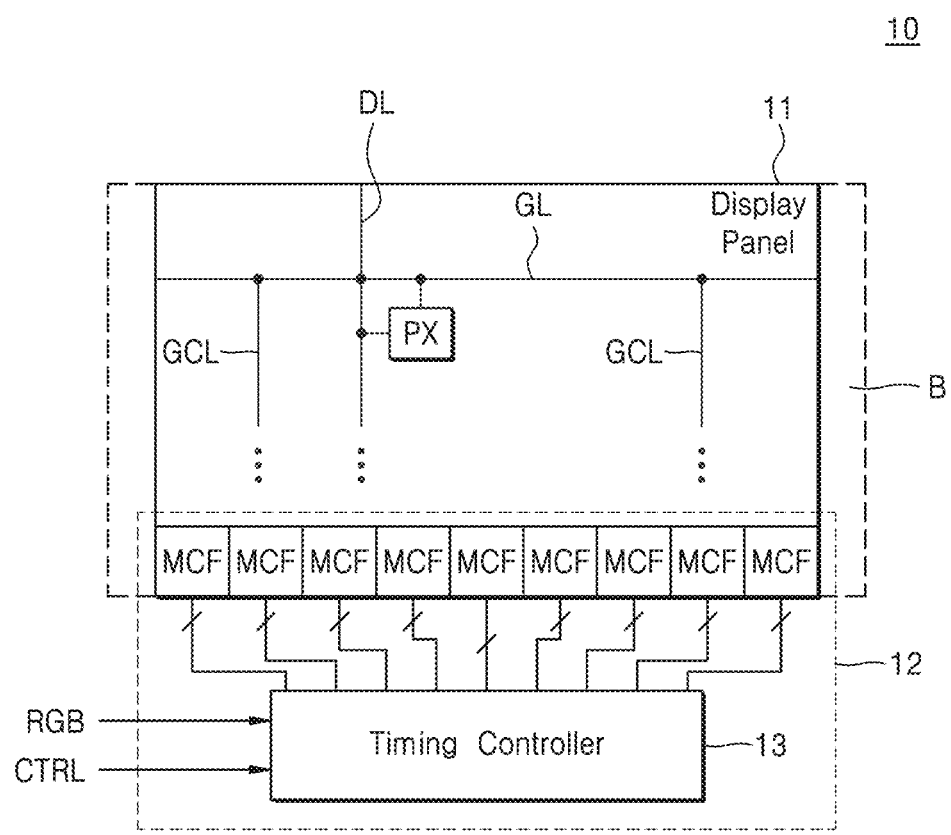
FIG. 1 is a diagram of a display device according to some example embodiments.

Hereinafter, some example embodiments will be described in detail with reference to the accompanying drawings. In the drawings, like reference characters denote like elements, and redundant descriptions thereof will be omitted.

Although terms such as "first," "second," and "third" may be used herein to describe various members, components, regions, layers, or sections, these terms are only used to distinguish one member, component, region, layer, or section from another member, component, region, layer, or section. The use of these terms, therefore, does not indicate a specific order and/or orientation, unless indicated otherwise. Thus, a first member, component, region, layer, or section referred to in examples described herein may also be referred to as a second member, component, region, layer, or section without departing from the teachings of the examples.

Spatially relative terms such as "bottom" may be used herein for ease of description to describe one element's relationship to another element, e.g., as shown in the figures. Such spatially relative terms are intended to encompass different orientations of the device in use or operation in addition to the orientation depicted in the figures. For example, the device may also be oriented in other ways (for example, turned over, and/or rotated 90 degrees and/or at other orientations), and the spatially relative terms used herein are to be interpreted accordingly.

FIG. 1 is a diagram of a display device 10 according to some example embodiments.

In some embodiments, the display device 10 may be mounted on an electronic device having an image display function. Some examples of the electronic device may include a smartphone, a tablet computer, a personal computer (PC), a portable multimedia player (PMP), a camera, a wearable device, an Internet of things (IoT) device, a television, a digital video disk (DVD) player, a refrigerator, an air conditioner, an air purifier, a set-top box, a robot, a drone, a medical device, a navigation device, a global positioning system (GPS) receiver, an advanced drivers assistance system (ADAS), a vehicle device, furniture, measuring equipment, and/or the like.

As shown in FIG. 1, the display device 10 may include a display panel 11 and a display controller 12. Although not shown, the display device 10 may further include a power management integrated circuit (PMIC), which supplies electrical power to the display panel 11 and the display controller 12.

The display panel 11 may include a display unit, on which an image (e.g., a real image) is displayed. For example, the display panel 11 may receive an electrically transmitted image signal and display an image, e.g., based on the image signal. The display panel 11 may correspond to a thin film transistor-liquid crystal display (TFT-LCD) panel, a light emitting diode (LED) panel, an organic light emitting diode (OLED) panel, a field emission display panel, a plasma display panel (PDP), and/or the like.

The display panel 11 may include data lines DL, gate lines GL, and gate connection lines GCL. FIG. 1 is illustrated as including a gate line GL, a data line DL, and two gate connection lines GCL for clarity, and the example embodiments are not so limited. The data lines DL may extend in a second direction (e.g., a Y direction) and be separate from each other in a first direction (e.g., an X direction) that is perpendicular to the second direction (e.g., the Y direction). The gate lines GL may extend in the first direction (e.g., the X direction) and be separate from each other in the second direction (e.g., the Y direction). The gate connection lines GCL may be separate from each other in the first direction (e.g., the X direction) and extend in the second direction (e.g., the Y direction) to be connected to a corresponding one of the gate lines GL. Each of the gate lines GL may be connected to at least one of the gate connection lines GCL. For example, in some example embodiments, each of the gate lines GL may be connected to three (or more) gate connection lines GCL. In some example embodiments, each of the gate lines GL may be connected to four gate connection lines GCL. As the size of the display panel 11 increases, the number of gate connection lines GCL connected to each of the gate lines GL may increase. The data lines DL may intersect with the gate lines GL. The data lines DL may be insulated from the gate lines GL. The gate lines GL may be driven by receiving control signals through the gate connection lines GCL.

The display panel 11 may include a plurality of pixels PX. The pixels PX may be arranged at regular intervals. The pixels PX may be respectively at the intersections between the data lines DL and the gate lines GL. For example, a pixel PX may be connected to a data line DL and a gate line GL corresponding to the connected data line DL.

Each of the pixels PX may include a transistor providing a driving current and a light emitting diode, which receives the driving current from the transistor and emits (and/or transmit) light. The transistor of each of the pixels PX may generate a driving current in response to an image signal received from the display controller 12 and provides the driving current to the light emitting diode.

The pixels PX may receive a scan signal from the gate lines GL and an image signal from the data lines DL. The scan signal and the image signal may be generated by a multi-chip film package MCF. The pixels PX may receive an image signal from the data lines DL based on a scan signal of the gate lines GL.

The pixels PX may display an image using a scan signal received through the gate lines GL and an image signal received through the data lines DL. In some example embodiments, e.g., when the display panel 11 is a liquid crystal panel, the refractive index of a liquid crystal included in the pixels PX may be changed by the image signal, and the transmittance of light may be changed by the change of the refractive index to display an image. When the display panel 11 is an organic light emitting panel, an image may be displayed with a current (and/or a voltage), which flows to a light emitting diode (e.g., an OLED) of a pixel PX, changed by the image signal.

The display panel 11 may be connected to and/or controlled by the display controller 12. The display controller 12 may include a timing controller 13 and a plurality of multi-chip film packages MCF. The display controller 12 (and/or the elements included therein) may include (and/or be included in) processing circuitry such as hardware including logic circuits; a hardware/software combination such as a processor executing software; and/or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The timing controller 13 may receive image data RGB and control signals CTRL from outside the display device 10, may convert (and/or correct) the received image data RGB and control signals CTRL, and may provide the converted and/or corrected image data and control signals to the multi-chip film packages MCF (e.g., based on the image data RGB and the control signals CTRL). The timing controller 13 may convert the image data RGB according to the interface specifications between the multi-chip film packages MCF and the timing controller 13, the structure of the display panel 11, and/or the like. The image data RGB may include, e.g., red, green, and blue image signals. The timing controller 13 may transmit the image data RGB to the multi-chip film packages MCF.

The timing controller 13 may receive various types of control signals CTRL. The control signals CTRL may include a vertical synchronization signal, a horizontal synchronization signal, a main clock signal, a data enable signal, and/or the like. The timing controller 13 may transmit the control signals CTRL to the multi-chip film packages MCF, and/or the timing controller 13 may control the multi-chip film packages MCF based on the control signals CTRL.

The multi-chip film packages MCF may be arranged in the, e.g., bottom of the display panel 11. The multi-chip film packages MCF may be connected to the gate connection lines GCL and the data lines DL of the display panel 11. The multi-chip film packages MCF may control the display panel 11 in response to the control signals CTRL (e.g., received from the timing controller 13). For example, the multi-chip film packages MCF may scan the display panel 11 according to the timing of each frame based on the control signals received from the timing controller 13 and display an image (e.g., a still image and/or a video) on the display panel 11 based on an image signal received from the timing controller 13. Although nine (9) multi-chip film packages MCF are illustrated in FIG. 1, this is just to show that a plurality of multi-chip film packages MCF may be arranged in the bottom of the display panel 11, and the example embodiments are not limited thereto.

A multi-chip film package MCF may include a gate integrated circuit (IC) and a source IC. The multi-chip film package MCF may correspond to a chip-on-film (COF) semiconductor chip package in which a gate IC and a source IC are mounted on a single film. When a plurality of multi-chip film packages MCF are arranged in the bottom of the display panel 11, a space B excluding the display panel 11 may be reduced and/or minimized Therefore, a display device 10 having a thin bezel may be realized. In addition, the manufacturing cost of the display device 10 may be decreased with a multi-chip film package MCF including a gate IC and a source IC.

The connection relationship between the display panel 11 and the multi-chip film package MCF is described in detail with reference to FIG. 2.

Figure 2:
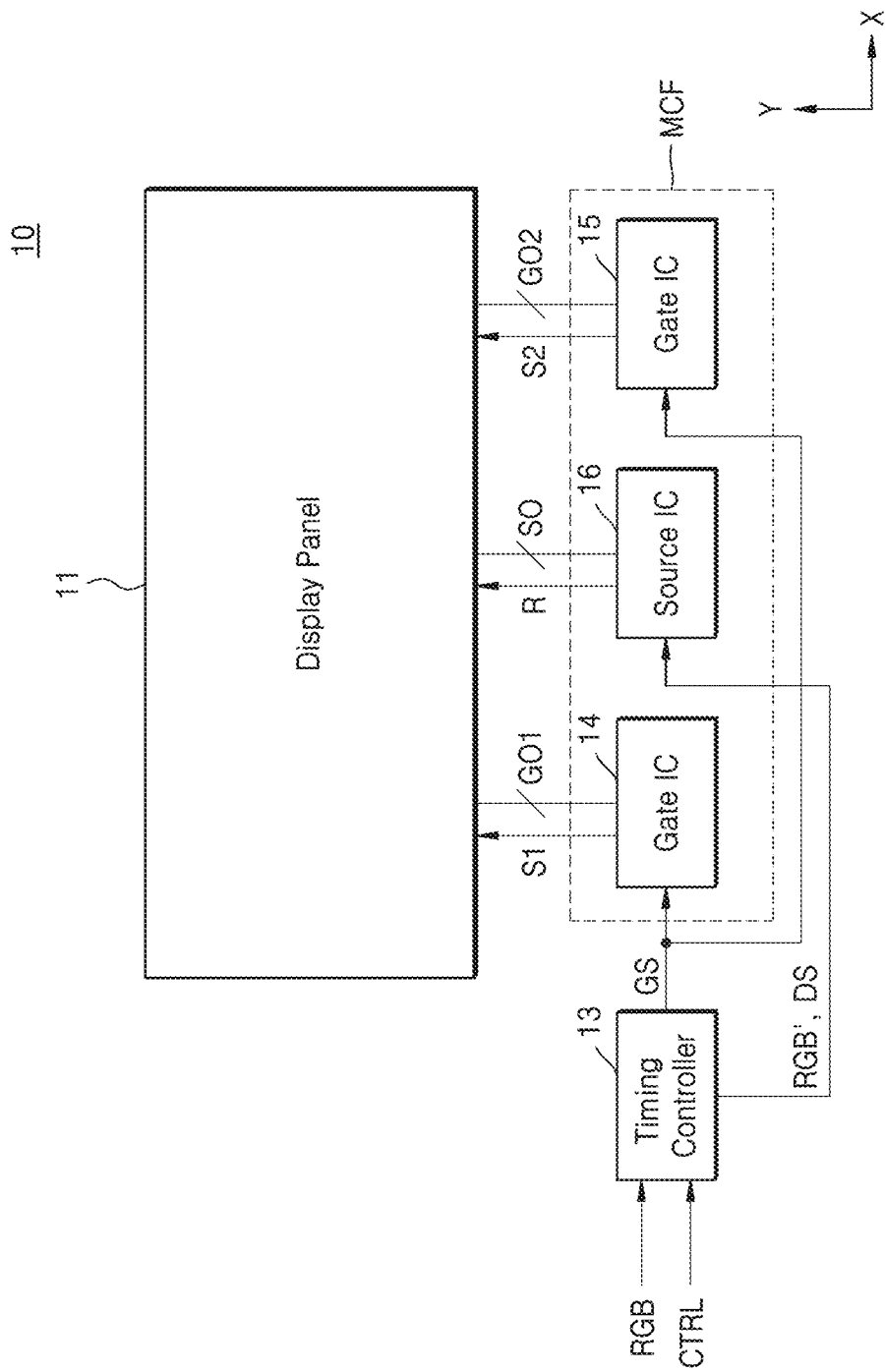
FIG. 2 is a diagram of a display device according to some example embodiments.

FIG. 2 is a diagram of the display device 10 according to some example embodiments. In detail, FIG. 2 describes an example display panel 11 and an example multi-chip film package MCF of FIG. 1 according to some example embodiments. Hereinafter, FIG. 2 is described with reference to FIG. 1.

Referring to FIG. 2, the multi-chip film package MCF may include a first gate integrated circuit ("IC") 14, a second gate IC 15, and a source IC 16. The multi-chip film package MCF may correspond to a film in which the first gate IC 14, the second gate IC 15, and the source IC 16 are mounted, e.g., as a single package. The film may include a flexible film. For example, the film may include a tape carrier package (TCP), a COF, a flexible print circuit (FPC), and/or the like. The multi-chip film package MCF may be connected to the data lines DL and the gate connection lines GCL.

The timing controller 13 may generate a gate control signal GS, a data control signal DS, and/or corrected image data RGB'. The timing controller 13 may transmit the gate control signal GS to the first gate IC 14 and/or the second gate IC 15. The gate control signal GS may include at least one of a vertical synchronization signal, a horizontal synchronization signal, a gate output enable signal, a gate clock signal, and/or the like.

The gate control signal transmitted to the first gate IC 14 may be different from the gate control signal transmitted to the second gate IC 15. A plurality of different gate control signals may be transmitted to the first gate IC 14, and a plurality of different gate control signals may be transmitted to the second gate IC 15. Hereinafter, for convenience of description, the gate control signal transmitted to the first gate IC 14 and the gate control signal transmitted to the second gate IC 15 are denoted by the same reference character ("GS"), but the example embodiments are not limited thereto.

The timing controller 13 may transmit the data control signal DS and the corrected image data RGB' to the source IC 16. The data control signal DS may include at least one of a source start signal, a source output enable signal, a source clock signal, and/or the like. The corrected image data RGB' may be generated (e.g., as described with reference to FIG. 1) by the timing controller 13 by converting the image data RGB to be suitable for a signal format used by the source IC 16.

The first gate IC 14 and the second gate IC 15 may respectively generate first and second scan signals S1 and S2 for controlling a pixel PX in response to the gate control signal GS. The first and second scan signals S1 and S2 may vary with the gate control signal GS. The first gate IC 14 may generate the first scan signal S1 in response to a first gate control signal, and the second gate IC 15 may generate the second scan signal S2 in response to a second gate control signal. In some example embodiments, the first gate IC 14 and the second gate IC 15 may generate a plurality of different scan signals in response to a plurality of different gate control signals. For example, the first scan signal S1 may refer to a plurality of different scan signals generated by the first gate IC 14, and the second scan signal S2 may refer to a plurality of different scan signals generated by the second gate IC 15. A scan signal may include a voltage level that turns a transistor of the pixel PX on or off.

The scan signal may be output through first gate output lines GO1 connected to the first gate IC 14 and second gate output lines GO2 connected to the second gate IC 15. The first gate output lines GO1 and the second gate output lines GO2 may be connected to the gate connection lines GCL of the display panel 11. Accordingly, the scan signal may be transmitted to the gate connection lines GCL through the first gate output lines GO1 and/or the second gate output lines GO2.

Because the gate connection lines GCL are connected to the gate lines GL, the scan signals respectively generated by the first gate IC 14 and the second gate IC 15 may be transmitted to the gate lines GL through the first gate output lines GO1 and/or the second gate output lines GO2. For example, each of the first gate IC 14 and the second gate IC 15 may drive the gate lines GL by transmitting a scan signal to the gate connection lines GCL through the first gate output lines GO1 or the second gate output lines GO2. Therefore, the scan signals S1 and S2 may be applied to the plurality of pixels PX respectively through the gate lines GL.

In some example embodiments, each of the first and second gate output lines GO1 and GO2 may be connected to a corresponding one of the gate connection lines GCL, and accordingly, the sum of the number of first gate output lines GO1 and the number of second gate output lines GO2 in a single multi-chip film package MCF may be equal to the number of gate connection lines GCL connected to the multi-chip film package MCF.

The source IC 16 may generate an image signal R for controlling a pixel PX in response to the corrected image data RGB' and the data control signal DS, which are received from the timing controller 13. The source IC 16 may convert the corrected image data RGB', (e.g., which may be a digital signal), into the image signal R (e.g., which may be an analog signal). The image signal R may be transmitted to the data lines DL through source output lines SO connected to the source IC 16. The source IC 16 may include, e.g., at least one of a shift register, a latch, a digital-to-analog converter, an output buffer, and/or the like.

In some example embodiments, the source output lines SO may be respectively connected to the data lines DL, and accordingly, the number of source output lines SO of the multi-chip film package MCF may be equal to the number of data lines DL connected to the multi-chip film package MCF.

The numbers of first gate output lines GO1, second gate output lines GO2, and source output lines SO may vary with the resolution of the display panel 11 and the number of multi-chip film packages MCF and/or with the size of the display panel 11. For example, the numbers of first gate output lines GO1 and second gate output lines GO2 may increase as the size of the display panel 11 and/or the number of pixels PX increases.

According to some example embodiments, the display device 10 includes at least one multi-chip film package MCF, in which the first gate IC 14, the second gate IC 15, and the source IC 16 are mounted on a single film, thereby reducing and/or minimizing a portion excluding the display panel 11. Therefore, the sense of immersion in a screen may be increased and/or maximized. Hereinafter, the configuration of the multi-chip film package MCF is described in detail, and various example embodiments of the multi-chip film package MCF are described.

Figure 3:
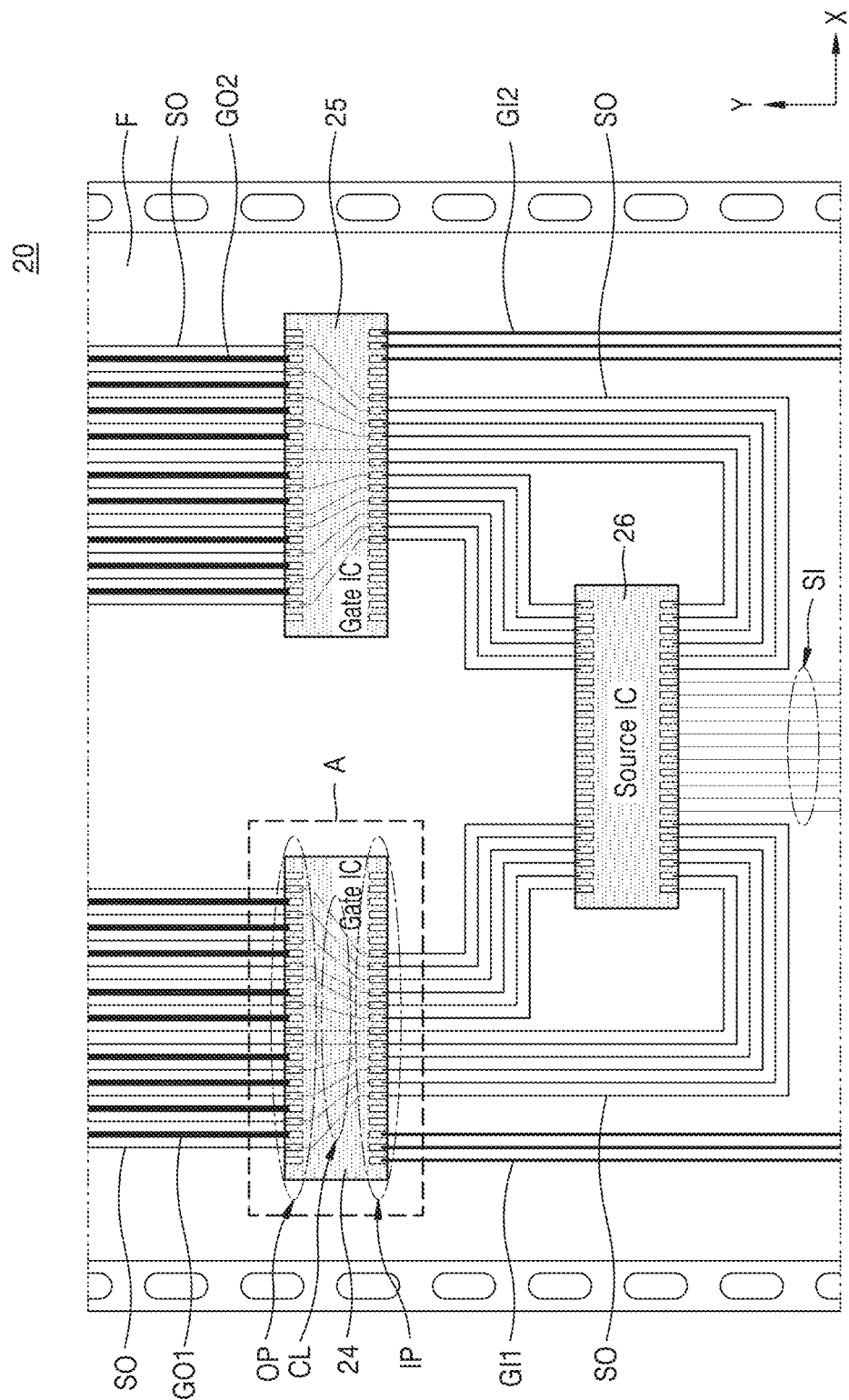
FIG. 3 is a diagram of a multi-chip film package according to some example embodiments.

FIG. 3 is a diagram of a multi-chip film package 20 according to some example embodiment. FIG. 3 may illustrate, e.g., the multi-chip film package MCF in FIGS. 1 and/or 2. Hereinafter, FIG. 3 is described with reference to FIGS. 1 and 2.

Referring to FIG. 3, the multi-chip film package 20 may include a film F; and a first gate IC 24, a second gate IC 25, and a source IC 26, which are mounted on the film F. The first gate IC 24, the second gate IC 25, and/or the source IC 26 may each be substantially the same as the first gate IC 14, the second gate IC 15, and/or the source IC 16, respectively, of FIG. 2.

The first gate IC 24 and the second gate IC 25 may be separate from each other in the first direction (e.g., the X direction). The first gate IC 24 and the second gate IC 25 may be on the same axis in the first direction (e.g., the X direction). The source IC 26 may be separate from the first gate IC 24 and the second gate IC 25 in the second direction (e.g., the Y direction). The source IC 26 may be in the middle of the film F in the first direction (e.g., the X direction).

The distance between the source IC 26 and the timing controller 13 may be shorter than the distance between the first gate IC 24 (and/or the second gate IC 25) and the timing controller 13. In the case where the source IC 26 is positioned such that the distance between the source IC 26 and the timing controller 13 is shorter than the distance between the timing controller 13 and the first gate IC 24 (and/or the second gate IC 25) the signal integrity may be improved. Accordingly, the noise of an input signal may be reduced. However, the example embodiments are not limited thereto. In some example embodiments, for example, the distance between the source IC 26 and the timing controller 13 may be the same and/or longer than the distance between the first gate IC 24 (and/or the second gate IC 25) and the timing controller 13.

The source IC 26 may be connected to source input lines SI and source output lines SO. The source IC 26 may include a plurality of input pins and a plurality of output pins. For example, the source IC 26 may be connected to the source input lines SI through the input pins and/or to the source output lines SO through output pins.

Referring to FIGS. 1 and 2, the corrected image data RGB' and the data control signals DS, which are output from the timing controller 13, may be transmitted to the source IC 26 through the source input lines SI. The source input lines SI may extend, e.g., towards the timing controller 13, in the second direction (e.g., the Y direction). In some example embodiments, the source input lines SI may be arranged in the middle of the film F in the first direction (e.g., the X direction).

An image signal output from the source IC 26 may be transmitted to the data lines DL (e.g., of FIG. 1) through the source output lines SO. In some example embodiments, the number of source output lines SO may be greater than the number of source input lines SI; and/or the length of the source output lines SO may be greater than the length of the source input lines SI.

Some of the source output lines SO may be connected to the source IC 26 through pins, which are adjacent to the source input lines SI in the first direction (e.g., the X direction). At least some of the plurality of the output pins of the source IC 26 which are connected with the source output lines SO, may be arranged at positions facing each other in the second direction Y. The source output lines SO may be connected to the output pins of the source IC 26 in a materially and/or spatially efficient manner (e.g., a manner of most simply implementing conductive patterns).

The first gate IC 24 may be connected to first gate input lines GI1 and first gate output lines GO1. The first gate IC 24 may include a plurality of input pins IP and a plurality of output pins OP. The first gate IC 24, for example, may be connected to the first gate input lines GI1 through input pins IP and to the first gate output lines GO1 through output pins OP.

The gate control signal GS output from the timing controller 13 may be transmitted to the first gate IC 24 through the first gate input lines GI1. The first gate input lines GI1 may extend in the second direction (e.g., the Y direction). In some example embodiments, the input pins IP connected to the first gate input lines GI1 may be arranged to be away from the second gate IC 25. The length of the first gate input lines GI1 may be greater than the length of the source input lines SI.

A scan signal generated by the first gate IC 24 may be transmitted to the gate connection lines GCL through the first gate output lines GO1. The number of first gate output lines GO1 may be greater than the number of first gate input lines GI1. The first gate output lines GO1 may extend in the second direction (e.g., the Y direction). The output pins OP of the first gate IC 24, which are connected to the first gate output lines GO1, may be formed at an opposite side of the first gate IC 24 to a side of the first gate IC 24 at which the input pins IP are formed.

The first gate output lines GO1 may be separate from each other in the first direction (e.g., the X direction), and the output pins OP may be arranged in a line. In some example embodiments, the number of output pins OP may be greater than the number of first gate output lines GO1. Accordingly, at least some of (and/or each of) the output pins OP, which are connected to the first gate output lines GO1, may be arranged between output pins OP, which are not connected to the first gate output lines GO1.

The second gate IC 25 may be connected to second gate input lines GI2 and second gate output lines GO2. The second gate IC 25 may include the same configuration as the first gate IC 24. The second gate input lines GI2 and the second gate output lines GO2 may be symmetrical with the first gate input lines GI1 and the first gate output lines GO1. Accordingly, the second gate input lines GI2 may extend in the second direction (e.g., the Y direction) and may be connected to input pins IP, which are farthest from the first gate IC 24 among the input pins IP of the second gate IC 25. A plurality of output pins OP of the second gate IC 25, which are connected to the second gate output lines GO2, may be formed at an opposite side of the second gate IC 25 to a side of the second gate IC 25, at which the input pins IP of the second gate IC 25 are formed. The second gate output lines GO2 may be separate from each other in the first direction (e.g., the X direction).

Some of the source output lines SO may pass through the first gate IC 24 and be connected to the data lines DL, and the others of the source output lines SO may pass through the second gate IC 25 and be connected to the data lines DL. The number of source output lines SO passing through the first gate IC 24 may be the same as and/or different from the number of source output lines SO passing through the second gate IC 25.

The source output lines SO passing through the first gate IC 24 and connected to the data lines DL may include a plurality of connection lines CL, which connect a plurality of input pins IP of the first gate IC 24 to a plurality of output pins OP of the first gate IC 24 within the first gate IC 24. For example, the source output lines SO passing through the first gate IC 24 and connected to the data lines DL may include first source lines connecting the source IC 26 to the input pins IP of the first gate IC 24, the connection lines CL connecting the input pins IP to the output pins OP in the first gate IC 24, and second source lines connecting the output pins OP to the data lines DL. The source output lines SO may include the connection lines CL formed in the first gate IC 24 and may thus pass through the first gate IC 24 and be connected to the data lines DL.

Each of the first gate output lines GO1 may be between two adjacent source output lines SO. In some example embodiments, the number of source output lines SO, which pass through the first gate IC 24 and are connected to the data lines DL, may be greater than the number of first gate output lines GO1. For example, a ratio between the number of source output lines SO, which pass through the first gate IC 24 and are connected to the data lines DL, and the number of first gate output lines GO1 may be 12:9. However, the example embodiments are not limited thereto.

Each of the source output lines SO, which pass through the first gate IC 24 and are connected to the data lines DL, may be between two adjacent first gate output lines GO1. The number of source output lines SO between two adjacent first gate output lines GO1 may be irregular. For example, a number of source output lines SO between two adjacent first gate output lines GO1 may be the same and/or different from a number of the number of source output lines SO between a neighboring pair of adjacent first gate output lines GO1. In some example embodiments, the number of source output lines SO between two adjacent first gate output lines GO1 may be one or two. One source output line SO may be arranged between two adjacent first gate output lines GO1, then two source output lines SO may be arranged between two adjacent first gate output lines GO1, and then one source output line SO may be arranged between two adjacent first gate output lines GO1. For example, each of some of the source output lines SO may be between two adjacent first gate output lines GO1. Accordingly, some of the first gate output lines GO1 may be separate from one another by different distances in the first direction (e.g., the X direction). For example, some of the first gate output lines GO1 may be separate from each other in the first direction (e.g., the X direction) with one source output line SO therebetween, and some of the first gate output lines GO1 may be separate from each other in the first direction (e.g., the X direction) with two source output lines SO therebetween.

In some example embodiments, assuming that G indicates a first gate output line GO1, and S indicates a source output line SO, the first gate output lines GO1 and the source output lines SO may be arranged in order of SGSGSGSGSSSGSGSSSGSGSGS in the first gate IC 24, starting from an output pin further (and/or furthest) away from the second gate IC 25 to an output pin closer to the second gate IC 25. However, the example embodiments are not limited thereto, and the first gate output lines GO1 and the source output lines SO may be arranged in various manners. In some example embodiments, the order the first gate output lines and source output lines (e.g., SGSGSGSGSSSGSGSSSGSGSGS) may be repeated.

The source output lines SO, which pass through the second gate IC 25 and are connected to the data lines DL, may include a plurality of connection lines, which connect a plurality of input pins of the second gate IC 25 to a plurality of output pins of the second gate IC 25 within the second gate IC 25. The source output lines SO may include the connection lines formed in the second gate IC 25 and may thus pass through the second gate IC 25 and be connected to the data lines DL.

The source output lines SO, which pass through the second gate IC 25 and are connected to the data lines DL, may be symmetrical (e.g., mirror) with the source output lines SO, which pass through the first gate IC 24 and are connected to the data lines DL. At least one second gate output line GO2 may be between two adjacent source output lines SO. The number of source output lines SO, which pass through the second gate IC 25 and are connected to the data lines DL, may be greater than the number of second gate output lines GO2.

One or two source output lines SO, which pass through the second gate IC 25 and are connected to the data lines DL, may be between two adjacent second gate output lines GO2. Because the source output lines SO, which pass through the second gate IC 25 and are connected to the data lines DL, may be symmetrical with the source output lines SO, which pass through the first gate IC 24 and are connected to the data lines DL, the second gate output lines GO2 and the source output lines SO may be arranged in order an opposite order (e.g., of SGSGSGSSSGSGSSSGSGSGSGS) in the second gate IC 25, starting from an output pin further away from the first gate IC 24 to an output pin closer to the first gate IC 24. However, example embodiments are not limited thereto, and the second gate output lines GO2 and the source output lines SO may be arranged in various manners.

For example, in some example embodiments, the first gate output lines GO1 and the second gate output lines GO2 may not be symmetrical.

Figure 4:
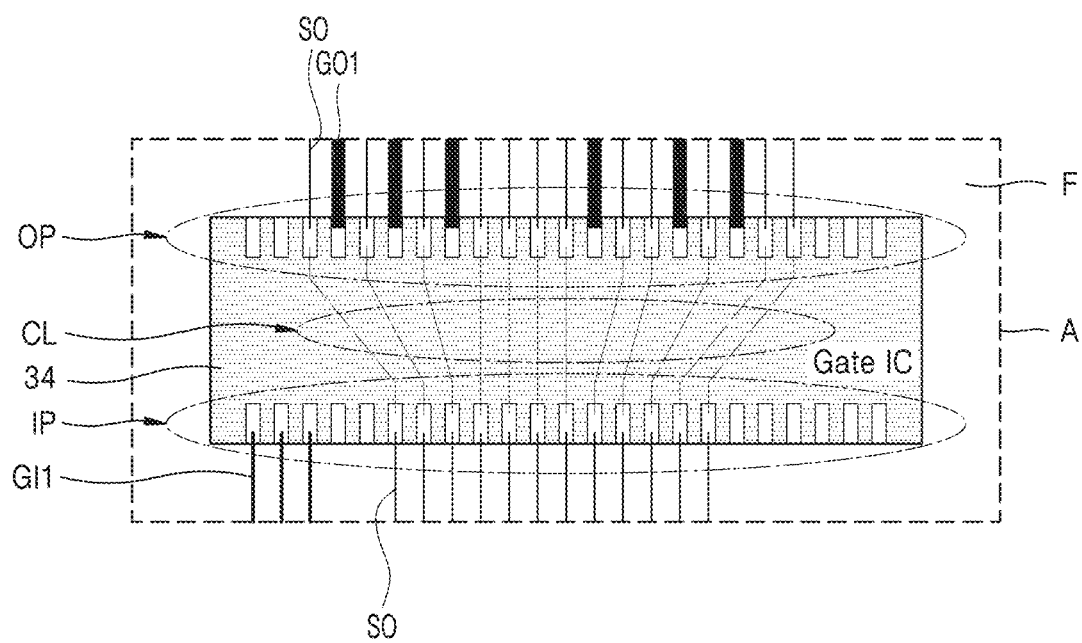
FIG. 4 is a diagram of a gate IC included in a multi-chip film package according to some example embodiments.

FIG. 4 is a diagram of a gate IC included in a multi-chip film package 30 according to some example embodiment. The multi-chip film package 30 may be another example of the multi-chip film package 20 of FIG. 3. The multi-chip film package 30 may have a configuration similar to that of the multi-chip film package 20 of FIG. 3. FIG. 4 illustrates a portion of the multi-chip film package 30. FIG. 4 illustrates a portion of the multi-chip film package 30 corresponding to region A in FIG. 3. Although only a first gate IC 34 is illustrated in FIG. 4, a second gate IC may have the same (and/or a mirrored) configuration as the first gate IC 34. Other elements excluding the first gate IC 34 and the second gate IC may be the same as those in FIG. 3. Hereinafter, FIG. 4 is described with reference to FIGS. 2 and 3.

Referring to FIG. 4, the numbers of first gate output lines GO1 and source output lines SO may vary with the resolution and/or size of the display panel 11 in FIG. 2. For example, and as noted above, as the size (and/or resolution) of the display panel 11 increases, the number pixels PX and/or gate connection lines GCL may increase, and accordingly, the number of first gate output lines GO1 may also increase.

The multi-chip film package 30 may be included in a display device having a smaller display panel than the display panel 11 including the multi-chip film package 20 of FIG. 3. Accordingly, a proportion of the first gate output lines GO1 of the multi-chip film package 30 may be less than a proportion of the first gate output lines GO1 in FIG. 3. For example, differently from that the ratio between the number of source output lines SO and the number of first gate output lines GO1 (e.g., 12:9) in the first gate IC 24 in FIG. 3, a ratio between the number of source output lines SO and the number of first gate output lines GO1 may be 12:6 in the first gate IC 34 in FIG. 4. However, the ratios between the number of source output lines SO and the number of first gate output lines GO1 are just examples, and the example embodiments are not limited thereto.

The number of source output lines SO, which pass through the first gate IC 34 and are connected to the data lines DL, may be greater than the number of first gate output lines GO1. Each of the first gate output lines GO1 may be between two adjacent source output lines SO. Some of the first gate output lines GO1 may be separate from one another by different distances in the first direction (e.g., the X direction). The number of first gate output lines GO1 between the adjacent source output lines SO may be irregular. For example, some of the first gate output lines GO1 may be separate from each other in the first direction (e.g., the X direction) with one source output line SO therebetween, some of the first gate output lines GO1 may be separate from each other in the first direction (e.g., the X direction) with two source output lines SO therebetween, and the others of the first gate output lines GO1 may be separate from each other in the first direction (e.g., the X direction) with four source output lines SO therebetween.

Source output lines SO may be arranged between two adjacent first gate output lines GO1. The number of source output lines SO arranged between two adjacent first gate output lines GO1 may be, e.g., one, two, three, and/or four. For example, the number of source output lines SO arranged between two adjacent first gate output lines GO1 may be one, two, and/or four. For example, in some example embodiments, four source output lines SO may be arranged between two adjacent first gate output lines GO1.

Assuming that G indicates a first gate output line GO1, and S indicates a source output line SO, the first gate output lines GO1 and the source output lines SO may be arranged, e.g., in order of SGSGSGSSSSGSSGSGSS. However, the example embodiments are not limited thereto, and the number of source output lines SO arranged between two adjacent first gate output lines GO1 may be greater than (and/or less than) four. The first gate output lines GO1 and the source output lines SO may be arranged in other various manners.

Figure 5:
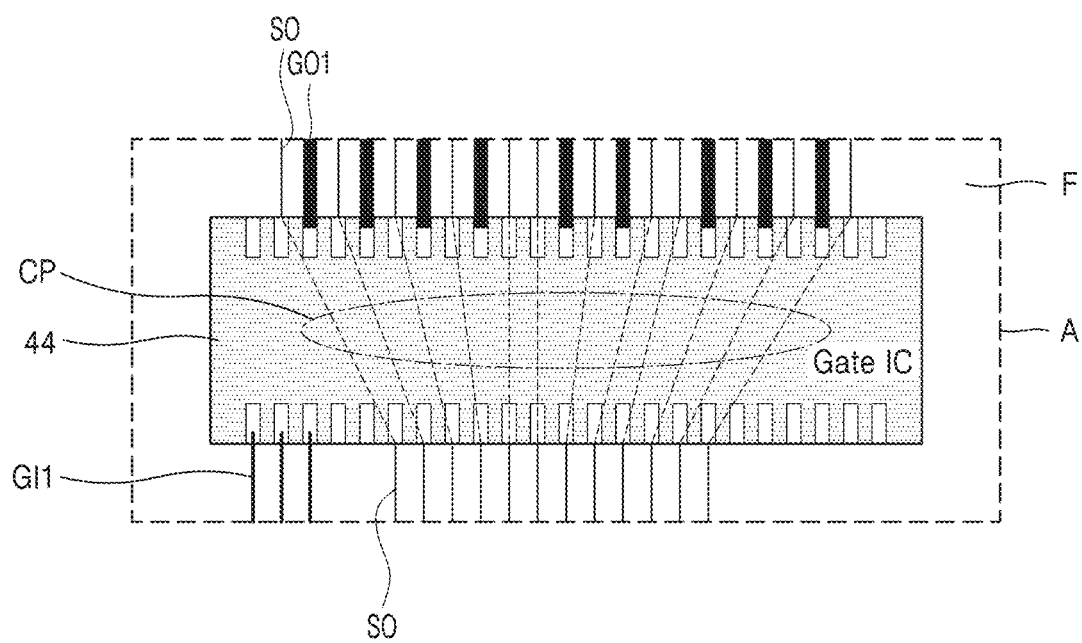
FIG. 5 is a diagram of a gate IC included in a multi-chip film package according to some example embodiments.

FIG. 5 is a diagram of a gate IC of a multi-chip film package 40 according to some example embodiments. The multi-chip film package 40 may be another example of the multi-chip film package 20 of FIG. 3. The multi-chip film package 40 may have a configuration similar to that of the multi-chip film package 20 of FIG. 3. FIG. 5 illustrates a portion of the multi-chip film package 40. FIG. 5 illustrates a portion of the multi-chip film package 40 corresponding to region A in FIG. 3. Although only a first gate IC 44 is illustrated in FIG. 5, a second gate IC may have the same (and/or a mirrored) configuration as the first gate IC 44. Other elements excluding the first gate IC 44 and the second gate IC may be the same as those in FIG. 3. Hereinafter, FIG. 5 is described with reference to FIG. 3.

Referring to FIG. 5, source output lines SO, which pass through the first gate IC 44 and are connected to the data lines DL, may be formed as conductive patterns CP below the first gate IC 44.

The conductive patterns CP may connect input pins to output pins in the first gate IC 44. The conductive patterns CP may be below the first gate IC 44 and/or in the film F. The conductive patterns CP may be formed using a conductive material such as a metal containing material. For example, the conductive patterns CP may be formed by plating a copper (Cu) pattern with gold (Au). The source output lines SO may pass through the first gate IC 44 using the conductive patterns CP and be connected to the data line DL.

Although not shown, the second gate IC 25 in FIG. 3 may include the same (and/or a mirrored) configuration as the first gate IC 44. Accordingly, some of the source output lines SO may be formed as the conductive patterns CP below the second gate IC 25. However, the example embodiments are not limited thereto. For example, in some example embodiments, some of the source output lines SO may be formed as the conductive patterns CP below the first gate IC 44, as shown in FIG. 5, and the others of the source output lines SO may include connection lines connecting input pins to output pins in the second gate 25, as shown in FIG. 3.

Figure 6:
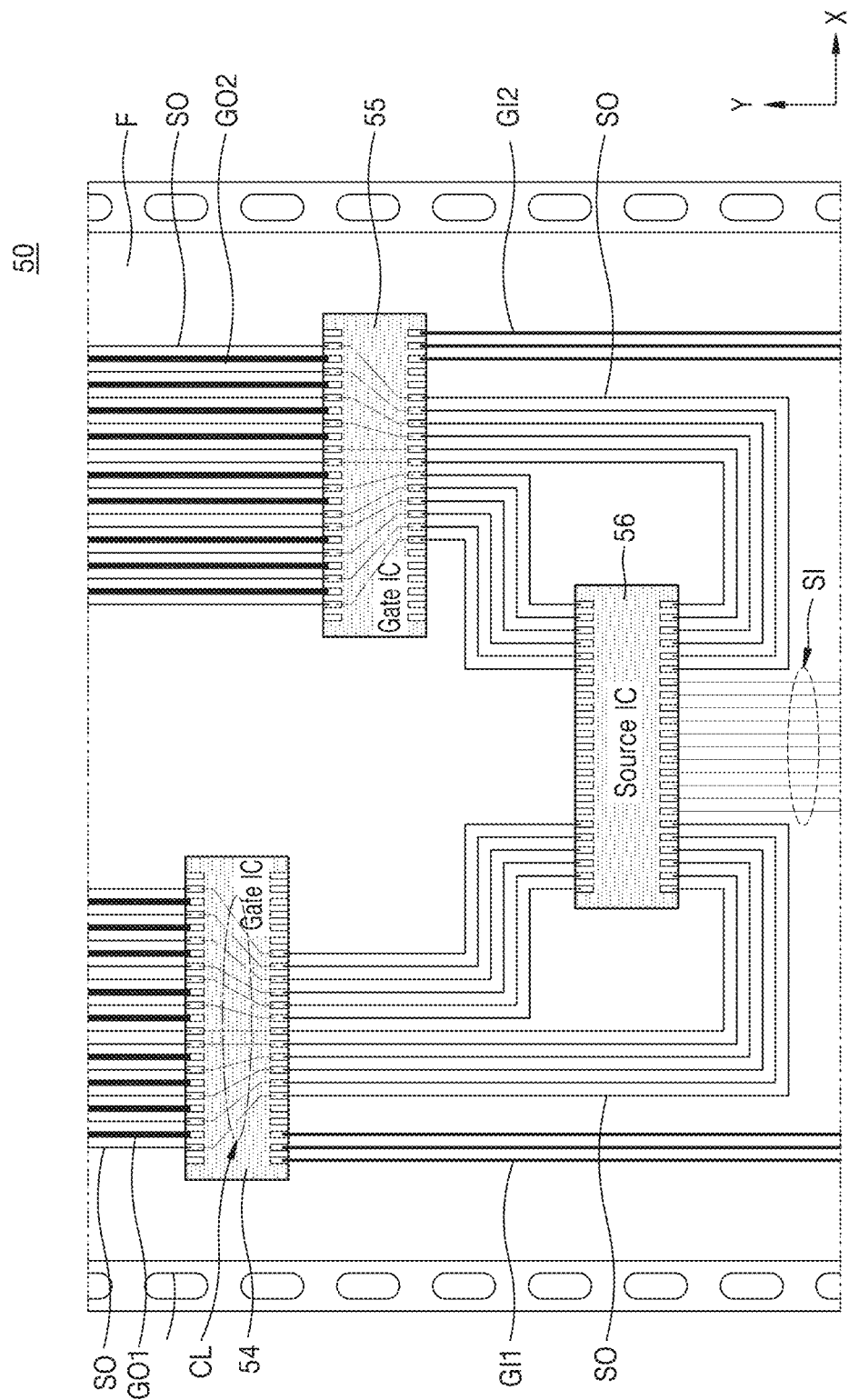
FIG. 6 is a diagram of a multi-chip film package according to some example embodiments.

FIG. 6 is a diagram of a multi-chip film package 50 according to some example embodiments. FIG. 6 is provided to describe another example of the multi-chip film package. The multi-chip film package 50 may be similar to the multi-chip film package 20 of FIG. 3. Hereinafter, a description of the similarities between FIG. 6 and FIG. 3 is omitted, and FIG. 6 is described with reference to FIG. 3.

Referring to FIG. 6, a first gate IC 54 may be separate from a second gate IC 55 in the first direction (e.g., the X direction). The first gate IC 54 may be on a different axis in the first direction (e.g., the X direction) than the second gate IC 55. For example, the first gate IC 54 and the second gate IC 55 may be separate from each other and may not be in line in the first direction (e.g., the X direction). For example, the distance between the first gate IC 54 and the display panel 11 may be shorter than the distance between the second gate IC 55 and the display panel 11.

A source IC 56 may be separate from the first gate IC 54 and the second gate IC 55 in the second direction (e.g., the Y direction). The source IC 56 may be in the middle of an axis in the first direction (e.g., the X direction).

According to some example embodiments, the multi-chip film package 50 includes the first gate IC 54 and the second gate IC 55 on different axes in the first direction (e.g., the X direction), and accordingly, input and output lines and ICs may be freely arranged on the film F. Therefore, the multi-chip film package 50 may be used in various display devices.

In addition, the first and second gate output lines GO1 and GO2 of the multi-chip film package 50 may vary with the resolution and/or size of the display panel 11, as described above with reference to FIGS. 4 and 5. Each of the source output lines SO of the multi-chip film package 50 may be formed as a conductive pattern below the first gate IC 54 and/or may include a connection line connecting an input pin of the first gate IC 54 to an output pin of the first gate IC 54 within the first gate IC 54 and thus be connected to a data line DL. Each of the source output lines SO of the multi-chip film package 50 may be formed as a conductive pattern below the second gate IC 55 and/or may include a connection line connecting an input pin of the second gate IC 55 to an output pin of the second gate IC 55 within the second gate IC 55 and thus be connected to a data line DL.

Figure 7:
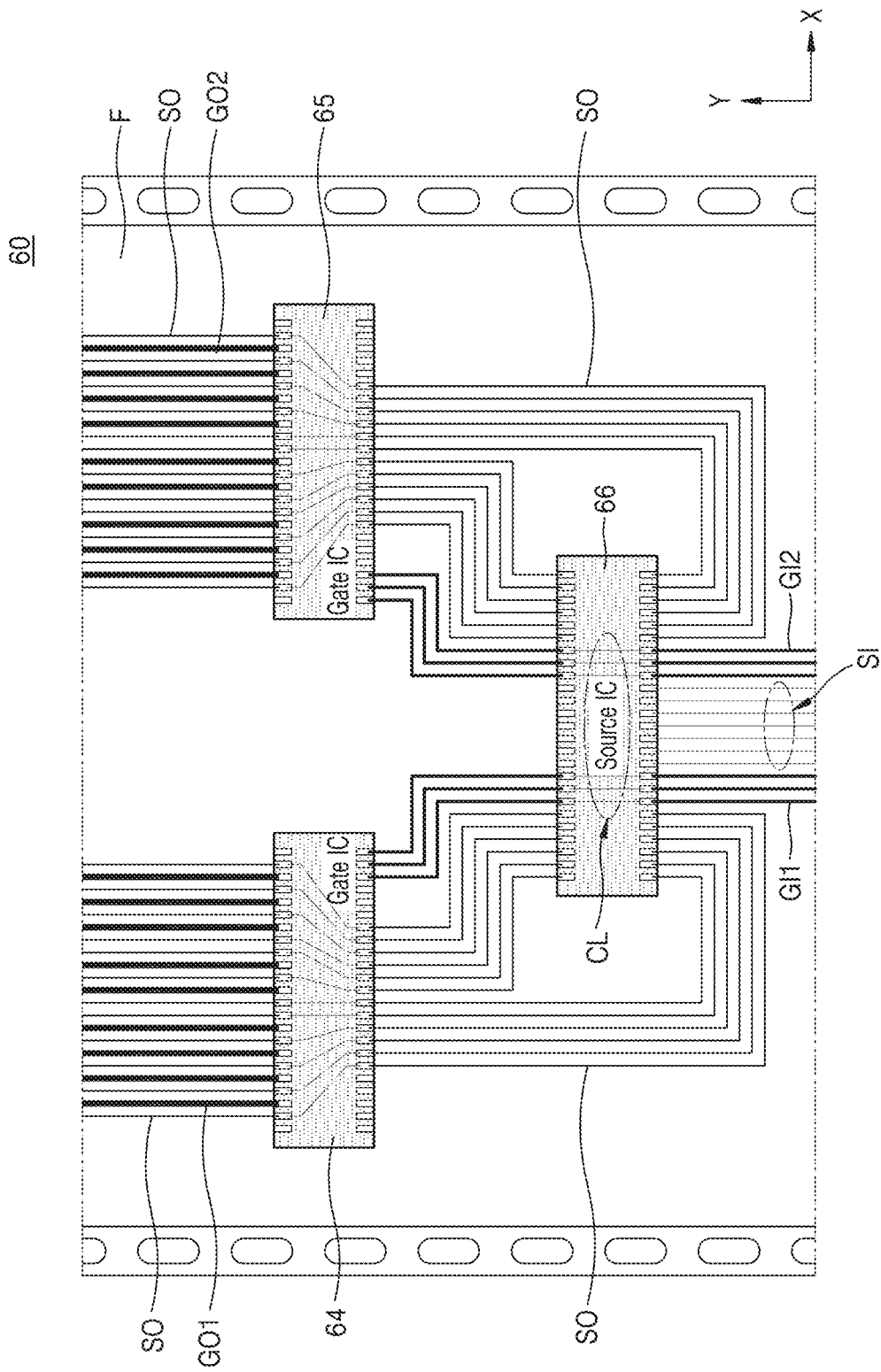
FIG. 7 is a diagram of a multi-chip film package according to some example embodiments.

FIG. 7 is a diagram of a multi-chip film package 60 according to some example embodiments. FIG. 7 is provided to describe another example of the multi-chip film package. The multi-chip film package 60 may be similar to the multi-chip film package 20 of FIG. 3. Hereinafter, a description of the similarities between FIG. 7 and FIG. 3 is omitted, and FIG. 7 is described with reference to FIG. 3.

Referring to FIG. 7, a first gate IC 64 may be connected to the first gate input lines GI1, and a second gate IC 65 may be connected to the second gate input lines GI2. Each of the first gate IC 64 and the second gate IC 65 may include a plurality of input pins IP. The first gate input lines GI1 may be connected to input pins IP that are close to the second gate IC 65. The second gate input lines GI2 may be connected to input pins IP that are close to the first gate IC 64.

The first gate input lines GI1 and the second gate input lines GI2 may pass through a source IC 66 and extend in the second direction (e.g., the Y direction). The first gate input lines GI1 and the second gate input lines GI2 may not overlap with the source input lines SI. For example, the source input lines SI may be between the first gate input lines GI1 and the second gate input lines GI2. The first gate input lines GI1 may be symmetrical with the second gate input lines GI2 with the source input lines SI between the first gate input lines GI1 and the second gate input lines GI2. The numbers of first gate input lines GI1 and second gate input lines GI2 shown in FIG. 7 are just examples and the example embodiments are not limited thereto.

The source IC 66 may include a plurality of input pins and a plurality of output pins. Each of the first gate input lines GI1 and the second gate input lines GI2, which pass through the source IC 66, may include a connection line CL, which connects an input pin to an output pin in the source IC 66. For example, each of the first gate input lines GI1 and the second gate input lines GI2 may pass through the source IC 66 and extend in the second direction (e.g., the Y direction) by including the connection line CL formed within the source IC 66.

In some example embodiments, as described in reference to FIG. 5, the first gate input lines GI1 and the second gate input lines GI2 may be formed as conductive patterns below the source IC 66. The conductive patterns may be formed in the film F and may connect input pins of the source IC 66 to output pins of the source IC 66. As such, the first gate input lines GI1 and the second gate input lines GI2 may pass through the source IC 66.

Figure 8:
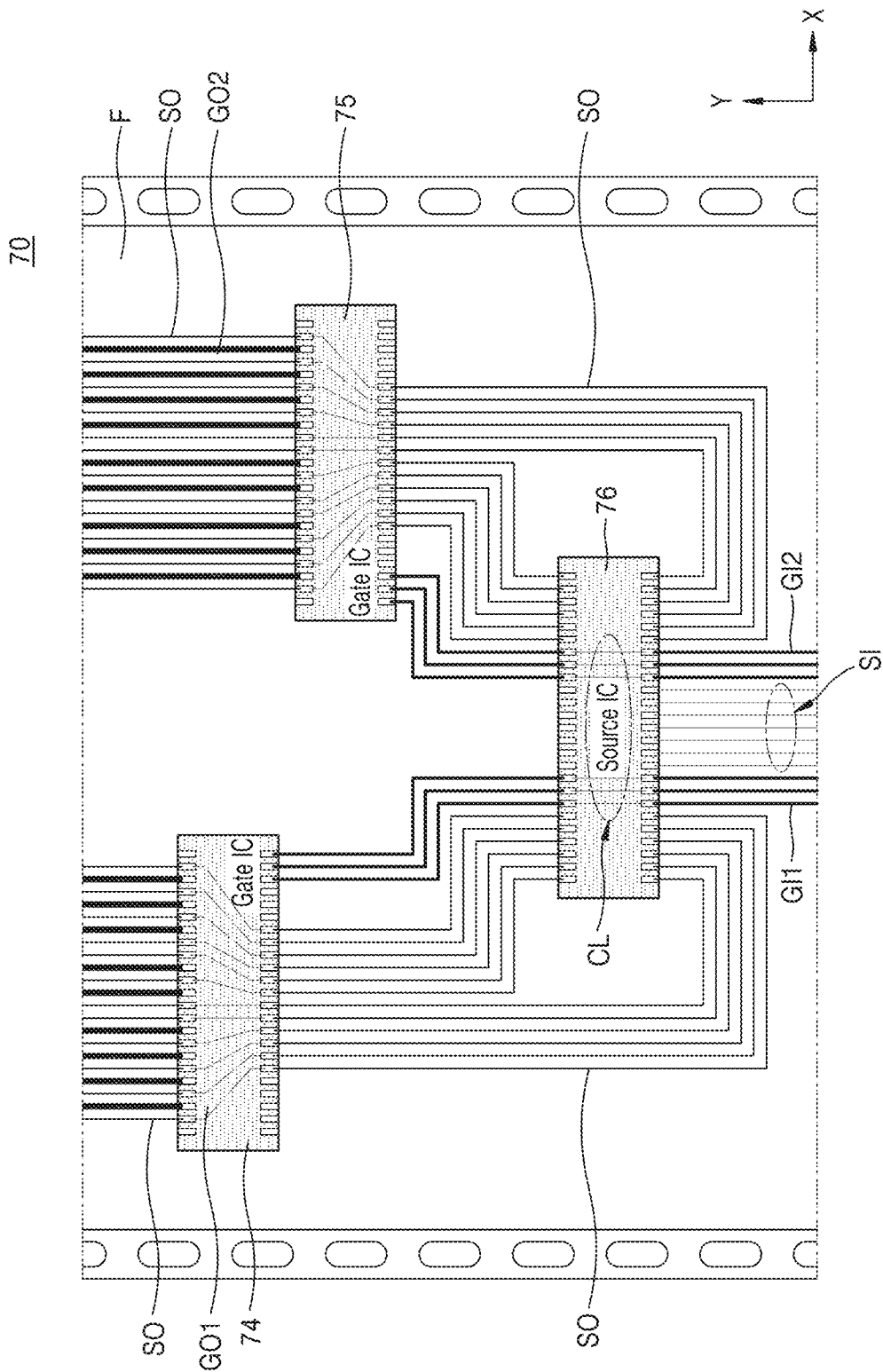
FIG. 8 is a diagram of a multi-chip film package according to some example embodiments.

FIG. 8 is a diagram of a multi-chip film package 70 according to some example embodiments. FIG. 8 is provided to describe another example of the multi-chip film package. The multi-chip film package 70 of FIG. 8 may be similar to the multi-chip film package of FIG. 7. Hereinafter, a description of the similarities between FIG. 8 and FIG. 7 is omitted FIG. 8 is described with reference to FIG. 7.

Referring to FIG. 8, the first gate input lines GI1 and the second gate input lines GI2 may pass through a source IC 76 and extend in the second direction (e.g., the Y direction). Each of the first gate input lines GI1 and the second gate input lines GI2 may include the connection line CL within the source IC 76 and/or may be formed as a conductive pattern below the source IC 76, thereby passing through the source IC 76.

A first gate IC 74 and a second gate IC 75 may be separate and on different axes from each other in the first direction (e.g., the X direction). For example, the first gate IC 74 and the second gate IC 75 may be separate from each other and may not be in line in the first direction (e.g., the X direction). The source IC 76 may be separate from the first gate IC 74 and the second gate IC 75 in the second direction (e.g., the Y direction). Because the first gate IC 74 and the second gate IC 75 are on different axes from each other in the first direction (e.g., the X direction), the multi-chip film package 70 may be variously configured.

Figure 9:
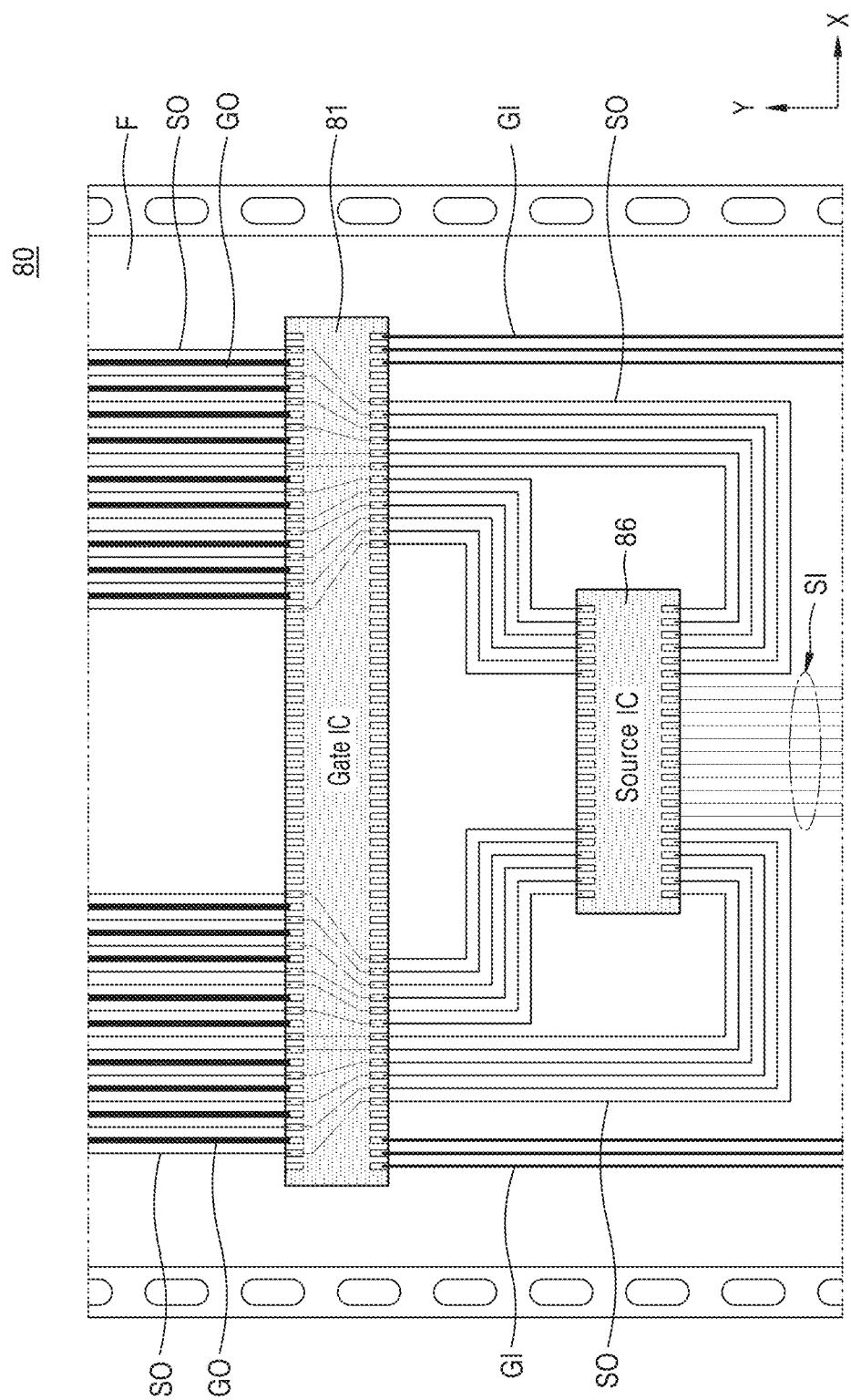
FIG. 9 is a diagram of a multi-chip film package according to some example embodiments.

FIG. 9 is a diagram of a multi-chip film package 80 according to some example embodiments. FIG. 9 is provided to describe another example of the multi-chip film package. The multi-chip film package 80 may be similar to the multi-chip film package 20 of FIG. 3. Hereinafter, a description of the similarities between FIG. 9 and FIG. 3 is omitted, and FIG. 9 is described with reference to FIG. 3.

Referring to FIG. 9, the multi-chip film package 80 may be configured such that a single gate IC 81 and a single source IC 86 are mounted on the film F. The gate IC 81 may be separate from the source IC 86 in the second direction (e.g., the Y direction). The gate IC 81 and the source IC 86 may be on the same axis in the second direction (e.g., the Y direction). The gate IC 81 and the source IC 86 may be in the middle of an axis in the first direction (e.g., the X direction).

Each of the gate IC 81 and the source IC 86 may include a plurality of input pins and a plurality of output pins. The gate IC 81 may include more input pins and more output pins than the source IC 86.

The gate IC 81 may be connected to gate input lines GI and gate output lines GO through input pins and output pins. The input pins of the gate IC 81 may be arranged in a line at a side of the gate IC 81, and the output pins of the gate IC 81 may be arranged in a line at an opposite side facing the side of the gate IC 81 at which the input pins are arranged. The gate input lines GI may be connected to input pins in both outermost portions of the gate IC 81. The gate input lines GI may not overlap with the source input lines SI and source output lines SO. For example, the gate input lines GI may be divided into two groups with source output lines SO therebetween.

The gate input lines GI may be connected to the input pins, which are separate in the first direction (e.g., the X direction) from input pins connected to the source output lines SO. The gate output lines GO may be separate from each other in the first direction (e.g., the X direction). The gate output lines GO may be separate from each other by irregular distances. For example, two adjacent gate output lines GO may be separate from each other with one or four output pins therebetween. Two adjacent gate output lines GO may be separate from each other with one, two, three, and/or four output pins therebetween.

The source IC 86 may be connected to the source input lines SI through input pins and to the source output lines SO through output pins. The source output lines SO may pass through the gate IC 81 and be connected to data lines.

At least one source output line SO may be between two adjacent gate output lines GO. For example, at least one source output line SO may be between two adjacent gate output lines GO and connected to an output pin that is not connected to any of the gate output lines GO. In some example embodiments, at least one source output line SO may be between two adjacent gate output lines GO. The number of source output lines SO between two adjacent gate output lines GO may be one, two, three, and/or four. However, the example embodiments are not limited thereto, and, for example, in some example embodiments, at least four source output lines SO may be between two adjacent gate output lines GO.

Although each of the source output lines SO includes a connection line, which connects an input pin of the gate IC 81 to an output pin of the gate IC 81 within the gate IC 81, in the example embodiments of FIG. 9, the example embodiments are not limited thereto. The source output lines SO may be formed as conductive patterns below the gate IC 81.

Figure 10:
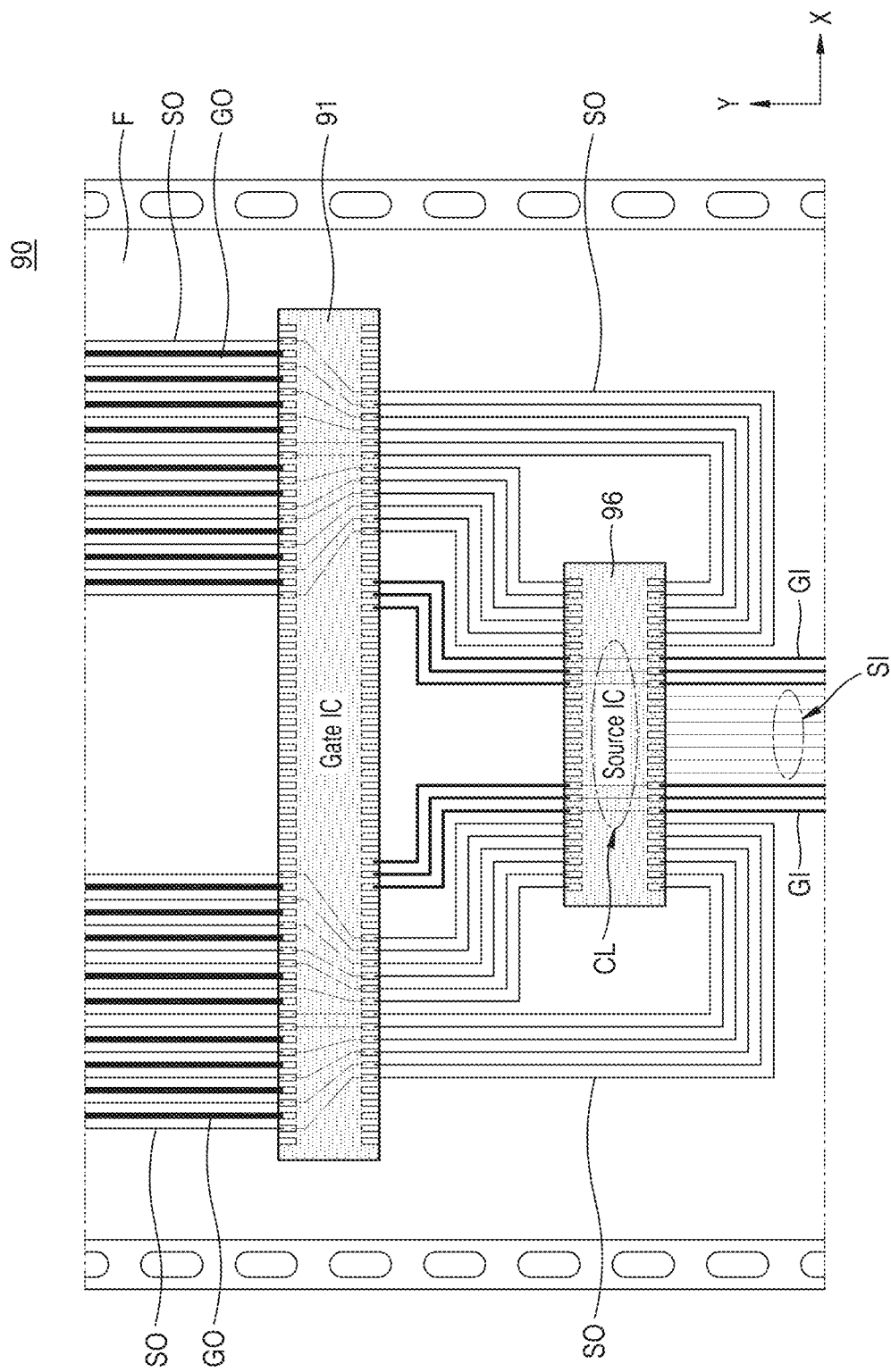
FIG. 10 is a diagram of a multi-chip film package according to some example embodiments.

FIG. 10 is a diagram of a multi-chip film package 90 according to some example embodiment. FIG. 10 is provided to describe another example of the multi-chip film package 80 of FIG. 9. The multi-chip film package 90 may be similar to the multi-chip film package 70 of FIG. 8. Hereinafter, a description of the similarities between FIG. 10 and FIG. 8 is omitted, and FIG. 10 is described with reference to FIG. 8.

Referring to FIG. 10, the gate input lines GI may pass through a source IC 96 and extend in the second direction (e.g., the Y direction). The gate input lines GI may not overlap with the source input lines SI. For example, the gate input lines GI may be divided into two groups with the source input lines SI therebetween.

The gate input lines GI may include connections lines CL, which respectively connect input pins of the source IC 96 to output pins of the source IC 96 within the source IC 96. In other words, because the gate input lines GI include the connections lines CL formed within the source IC 96, the gate input lines GI may pass through the source IC 96 and extend in the second direction (e.g., the Y direction). In some example embodiments, the gate input lines GI may pass through the source IC 96 via conductive patterns formed below the source IC 96. The gate input lines GI may connect input pins of the source IC 96 to output pins of the source IC 96 through the conductive patterns formed below the source IC 96.

While the inventive concepts have been particularly shown and described with reference to some example embodiments thereof, it will be understood that various changes in form and details may be made therein without departing from the spirit and scope of the following claims.

What is claimed is:

1. A display device comprising:
a display panel including data lines configured to receive an image signal, gate lines configured to receive a scan signal, and gate connection lines configured to transmit the scan signal to the gate lines; and
a multi-chip film package including, on a film, a first gate integrated circuit (IC) configured to transmit a first scan signal to the gate connection lines through first gate output lines, a second gate IC configured to transmit a second scan signal to the gate connection lines through second gate output lines, and a source IC configured to transmit the image signal to the data lines through source output lines,
wherein each of the first gate output lines is between two adjacent ones of the source output lines, and each of the second gate output lines is between another two adjacent ones of the source output lines.

2. The display device of claim 1, wherein the source output lines include a conductive pattern below the first gate IC and in the film.

3. The display device of claim 1, wherein each of the source output lines includes a connection line connecting an input pin of the first gate IC to an output pin of the first gate IC within the first gate IC.

4. The display device of claim 1, wherein the first gate IC and the second gate IC are on a same axis in a first direction.

5. The display device of claim 1, wherein the first gate IC and the second gate IC are on different axes from each other in a first direction.

6. The display device of claim 1, wherein some of the first gate output lines are separated from one another by different distances in a first direction.

7. The display device of claim 1, wherein some of the source output lines are between two adjacent ones of the first gate output lines.

8. The display device of claim 1, wherein the source output lines include consecutive four source output lines between two adjacent ones of the first gate output lines.

9. The display device of claim 1, wherein numbers of the source output lines between two adjacent first gate output lines is irregular.

10. The display device of claim 1, wherein the first gate IC includes a plurality of input pins and is configured to receive a gate control signal through first gate input lines connected to input pins, among the plurality of input pins, farthest from the second gate IC.

11. The display device of claim 1, wherein
the first gate IC includes a plurality of input pins and is configured to receive a gate control signal through first gate input lines connected to input pins, of the plurality of input pins, closest to the second gate IC,
the first gate input lines include a conductive pattern below the source IC and in the film.

12. The display device of claim 1, wherein
the first gate IC includes a plurality of input pins and is configured to receive a gate control signal through first gate input lines connected to input pins closest to the second gate IC among the plurality of input pins, and
the first gate input lines include a connection line that passes through the source IC and connects an input pin of the source IC and an output pin of the source IC.

13. The display device of claim 1, further comprising:
a timing controller configured to transmit control signals to the multi-chip film package,
wherein a distance between the source IC and the timing controller is shorter than a distance between the first gate IC and the timing controller.

14. A display device comprising a multi-chip film package including:
a first gate integrated circuit (IC) on a film;

a second gate IC on the film, the second gate IC isolated from direct contact with the first gate IC in a first direction and on a same axis in the first direction as the first gate IC; and a source IC on the film, the source IC isolated from direct contact with the first gate IC and the second gate IC in a second direction perpendicular to the first direction, wherein each of first gate output lines are configured to transmit an output signal of the first gate IC and is between two adjacent ones of source output lines configured to transmit an output signal of the source IC, and each of second gate output lines is configured to transmit an output signal of the second gate IC and is between two adjacent ones of the source output lines.

15. The display device of claim 14, wherein some of the first gate output lines are separated from one another by different distances in the first direction.

16. The display device of claim 14, wherein a number of the source output lines between two adjacent ones of the first gate output lines is at least one selected from one, two, three, or four.

17. The display device of claim 14, wherein
each of the source output lines includes at least one of a conductive pattern or a connection line,
the conductive pattern below the first gate IC and in the film, and
the connection line connecting an input pin of the first gate IC to an output pin of the first gate IC.

18. A display device comprising a multi-chip film package including:

a first gate integrated circuit (IC) on a film;

a second gate IC on the film, the second gate IC isolated from direct contact with the first gate IC in a first direction and on a different axis in the first direction than the first gate IC; and a source IC on the film, the source IC isolated from direct contact with the first gate IC and the second gate IC in a second direction perpendicular to the first direction, wherein each of first gate output lines are configured to transmit an output signal of the first gate IC and is between two adjacent ones of source output lines transmitting an output signal of the source IC, and each of second gate output lines is configured to transmit an output signal of the second gate IC and is between two adjacent ones of the source output lines.

19. The display device of claim 18, wherein a number of the source output lines between two adjacent ones of the first gate output lines is at least one selected from one, two, three, or four.

20. The display device of claim 18, wherein
each of the source output lines includes at least one of a conductive pattern or a connection line,
the conductive pattern below the first gate IC and in the film, and
the connection line connecting an input pin of the first gate IC to an output pin of the first gate IC within the first gate IC.

* * * * *